US012439242B2

(12) United States Patent
Tao et al.

(10) Patent No.: US 12,439,242 B2
(45) Date of Patent: Oct. 7, 2025

(54) METHOD AND APPARATUS FOR PROVIDING EDGE SERVICE

(71) Applicant: Telefonaktiebolaget LM Ericsson (publ), Stockholm (SE)

(72) Inventors: Jingrui Tao, Guangdong (CN); Yun Zhang, Guangdong (CN); Fengpei Zhang, Guangdong (CN); Shingwa Wong, Saratoga, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 343 days.

(21) Appl. No.: 17/924,703

(22) PCT Filed: Apr. 23, 2021

(86) PCT No.: PCT/CN2021/089405
§ 371 (c)(1),
(2) Date: Nov. 11, 2022

(87) PCT Pub. No.: WO2021/227833
PCT Pub. Date: Nov. 18, 2021

(65) Prior Publication Data
US 2023/0199480 A1    Jun. 22, 2023

(30) Foreign Application Priority Data
May 15, 2020   (WO) ................ PCT/CN2020/090580

(51) Int. Cl.
*H04W 8/26*      (2009.01)
*H04L 61/5007*   (2022.01)
*H04L 101/618*   (2022.01)

(52) U.S. Cl.
CPC .......... *H04W 8/26* (2013.01); *H04L 61/5007* (2022.05); *H04L 2101/618* (2022.05)

(58) Field of Classification Search
CPC . H04W 8/06; H04L 61/5007; H04L 2101/618
(Continued)

(56) References Cited

U.S. PATENT DOCUMENTS

| 2020/0112391 | A1* | 4/2020 | Yang | H04L 5/0053 |
| 2024/0155547 | A1* | 5/2024 | Ivanov | H04W 12/79 |
| 2024/0381247 | A1* | 11/2024 | Petel | H04W 64/003 |

FOREIGN PATENT DOCUMENTS

| CN | 108616340 A | 10/2018 |
| CN | 109040337 A | 12/2018 |

OTHER PUBLICATIONS

3GPP TR 23.758 v1.1.0 (Nov. 2019) (Year: 2019).*
(Continued)

*Primary Examiner* — Hermon Asres
(74) *Attorney, Agent, or Firm* — Withrow & Terranova, PLLC

(57) ABSTRACT

Embodiments of the present disclosure provide methods and apparatus for providing edge service. A method performed at a first network function comprises: receiving, a request for querying information associated to a location of a terminal device; wherein the request includes an internet protocol, IP, address of the terminal device; obtaining, from a second network function, a global identifier of the terminal device, based on the IP address of the terminal device; obtaining a location of the terminal device, based on the global identifier or the IP address of the terminal device; and transmitting, information associated to the location of the terminal device.

14 Claims, 19 Drawing Sheets

(58) Field of Classification Search
USPC .......................................................... 370/338
See application file for complete search history.

(56) References Cited

OTHER PUBLICATIONS

Author Unknown, "Technical Specification Group Services and System Aspects; Study on application architecture for enabling Edge Applications," Technical Report 23.758, Version 1.1.0, Nov. 2019, 3GPP Organizational Partners, 113 pages.

Author Unknown, "Technical Specification Group Services and System Aspects; System architecture for the 5G System (5GS); Stage 2 (Release 16)," Technical Specification 23.501, Version 16.4.0, Mar. 2020, 3GPP Organizational Partners, 430 pages.

Author Unknown, "Technical Specification Group Services and System Aspects; Procedures for the 5G System (5GS); Stage 2 (Release 16)," Technical Specification 23.502, Version 16.4.0, Mar. 2020, 3GPP Organizational Partners, 582 pages.

Author Unknown, "Technical Specification Group Services and System Aspects; Policy and charging control framework for the 5G System (5GS); Stage 2 (Release 16)," Technical Specification 23.503, Version 16.4.1, Apr. 2020, 3GPP Organizational Partners, 115 pages.

Kekki, et al., "MEC in 5G networks," ETSI White Paper No. 28, Jun. 2018, ETSI, 28 pages.

International Search Report and Written Opinion for International Patent Application No. PCT/CN2021/089405, mailed Jul. 7, 2021, 10 pages.

Extended European Search Report for European Patent Application No. 21802975.9, mailed Dec. 14, 2023, 11 pages.

\* cited by examiner

METHOD AND APPARATUS FOR PROVIDING EDGE SERVICE

This application is a 35 U.S.C. § 371 national phase filing of International Application No. PCT/CN2021/089405, filed Apr. 23, 2021, which claims the benefit of International Application No. PCT/CN2020/090580, filed May 15, 2020, the disclosures of which are incorporated herein by reference in their entireties.

TECHNICAL FIELD

The present disclosure relates generally to the technology of wireless communication, and in particular, to a method and an apparatus for providing an edge service.

BACKGROUND

This section introduces aspects that may facilitate better understanding of the present disclosure. Accordingly, the statements of this section are to be read in this light and are not to be understood as admissions about what is in the prior art or what is not in the prior art.

Edge computing as an evolution of cloud computing brings application hosting/server from centralized data centers down to the network edge, such as the local network to which the consumer is directly connected. Thus, the spatial distances between consumers and application hosting/server are much closer and the transmission paths of the data generated by devices and application hosting/server are greatly shortened.

Therefore, the edge computing is acknowledged as one of the key pillars for meeting the demanding Key Performance Indicators (KPIs) of future communication systems, such as $5^{th}$ generation system, 5G system, especially as far as low latency and bandwidth efficiency are concerned.

FIG. 1A is an exemplary diagram showing a structure for securely providing 3GPP network interfaces to external 3rd party servers.

As shown in FIG. 1A, to enable operators to use their network programming ability to maximize innovation, shorten time to market and create great services for consumers and enterprise, 3GPP defines Service Capability Exposure Function (SCEF) in 4G and Network Exposure Function (NEF) in 5G to expose network capability via an application programming interface (API). Today, the overall architecture for SCEF and NEF which enables the 3GPP network to securely expose its services and capabilities provided by 3GPP network interfaces to external 3rd party service provider SCS/AS hosting an Application(s).

Via interfaces N33 and T8, the application function/application server, AF/AS, may call/access API set provided by the SCEF+NEF, to communicate with the core network in trust domain. The core network may include Evolved Packet Core, EPC, with EPC nodes, and $5^{th}$ generation core, 5GC, with NFs.

Some discussions and researches are already made for implementing edge computing/application/service under current communication system structure. For example, in the $3^{rd}$ generation partnership project technical specifications, 3GPP TS, for 5G system, there is a set of new functionalities that serves as enablers for edge computing. These enablers are essential for integrated Mobile Edge Computing, MEC, deployments in 5G networks.

As in such 5G system specifications, such as 3GPP TS 23.501 V16.4.0 (2020 March), 3GPP TS 23.502 V16.4.0 (2020 March), the edge computing/application may be supported by one or a combination of the following enablers (e.g. functionalities):

User plane (re)selection: the 5G Core Network (re)selects UPF to route the user traffic to the local Data Network as described in 3GPP TS 23.501 clause 6.3.3;

Local Routing and Traffic Steering: the 5G Core Network selects the traffic to be routed to the applications in the local Data Network;

This includes the use of a single protocol data unit, PDU, Session with multiple PDU Session Anchor(s) (UL CL (Uplink Classifier)/IP v6 multi-homing) as described in 3GPP TS 23.501 clause 5.6.4;

Session and service continuity to enable UE and application mobility as described in 3GPP TS 23.501 clause 5.6.9;

An Application Function may influence UPF (re)selection and traffic routing via PCF or NEF as described in 3GPP TS 23.501 clause 5.6.7;

Network capability exposure: 5G Core Network and Application Function to provide information to each other via NEF as described in clause 5.20 or directly as described in 3GPP TS 23.502 clause 4.15;

QoS and Charging: PCF provides rules for QoS Control and Charging for the traffic routed to the local Data Network;

Support of Local Area Data Network: 5G Core Network provides support to connect to the LADN (Local Area Data Network) in a certain area where the applications are deployed as described in 3GPP TS 23.501 clause 5.6.5.

Further, one example of the high-level architecture of Capability Exposure for edge computing is shown in FIG. 1B: (from FIG. 5 of ETSI (European Telecommunications Standards Institute) White Paper: MEC in 5G networks https://www.etsi.org/images/files/ETSIWhitePapers/etsi_wp28_mec_in_5G_FINAL.pdf)

Refer to FIG. 1B and the white paper, MEC Orchestrator (MEC System Level Management) works as a 5G application function, AF, utilizing following network capabilities exposed from SCEF+NEF:

Monitoring/notification, which allows an external entity to request or subscribe to UE related events of interest. The monitored events include a UE's roaming status, UE loss of connectivity, UE reachability and location related events (e.g. location of a specific UE, or identification of UEs within a geographical area). The AMF & UDM are the key entities in providing access to such event information;

Provisioning/subscription, which allows an external entity to provision expected UE behaviour to the 5G system, for instance predicted UE movement, or communication characteristics;

Policy and Charging, which handles QoS and charging policy for UE based requests made by an external party, which also facilitates sponsored data services. The PCF is the key entity with regard to Policy and Charging Control (PCC), although most NFs are involved to some degree in supporting the PCC framework;

AF Influence Traffic Routing, which allows external entity (Application Function) to influence UPF (re) selection and traffic routing directly.

It should be understood, the MEC Host can be owned by any Operator edge system or HyperScale cloud provider, such as those providing/selling network service to normal consumer/user.

The 5G core network may further include AUSF, UDM, NRF, PCF, AMF, and SMF. When the edge computing/application from the MEC platform in the LADN to the UE is provided, the UE is connected to the MEC platform via the RAN and the UPF (edge UPF). DU refers to Distributed Unit (of RAN). CU refers to Centralized Unit (of RAN).

However, in such specifications, the specific manner for how to provide the edge service to the terminal device is not defined. The specific manner here may include the specific participating functions/nodes, and the specific steps of method performed by these functions/nodes.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Certain aspects of the present disclosure and their embodiments may provide solutions to these or other challenges. There are, proposed herein, various embodiments which address one or more of the issues disclosed herein. Particularly, as a response of the request including an IP address of a terminal device, a network function may provide information associated to the location of the terminal device. Then, various services, such as edge service, may be provided to the terminal device, based on the location of the terminal device.

A first aspect of the present disclosure provides a method performed at a first network function. The method may comprise: receiving, a request for querying information associated to a location of a terminal device. The request may include an internet protocol, IP, address of the terminal device. The method may further comprise: obtaining, from a second network function, a global identifier of the terminal device, based on the IP address of the terminal device, obtaining a location of the terminal device, based on the global identifier or the IP address of the terminal device, and transmitting, information associated to the location of the terminal device.

In embodiments of the present disclosure, the request may be for querying the location of the terminal device. The transmitted information may include the location of the terminal device.

In embodiments of the present disclosure, the request may be for querying an IP address of a server for supporting an application. The request may further include a fully qualified domain name, FQDN, of the application. The method may further comprise: determining the server for supporting the application, based on at least the location of the terminal device, the FQDN of the application, and the global identifier of the terminal device. The transmitted information may include an IP address of the determined server.

In embodiments of the present disclosure, the method may further comprise: requesting a policy control function, PCF, for a user plane function, UPF, reselection.

In embodiments of the present disclosure, the first network function may use a procedure of application function influence traffic routing for requesting UPF reselection.

In embodiments of the present disclosure, determining the server for supporting the application may comprise: obtaining, from a third network function, information of at least one server available for supporting the application, based on the location of the terminal device, the global identifier of the terminal device, and the FQDN of the application, selecting the determined server for supporting the application from the at least one server, and obtaining, from a unified data management, UDM, a determination that a local break out, LBO, procedure and/or a quality of service, QoS, change for the terminal device is allowed.

In embodiments of the present disclosure, the determined server may be in an edge network to which the terminal device is connected. The terminal device may be connected to the determined server via an edge UPF in the edge network, during the LBO procedure. A request from the first network function to PCF for UPF reselection includes at least one of: the IP address of the terminal device, the IP address of the determined server, a port for the application and a protocol for the application.

In embodiments of the present disclosure, an edge application configuration may be provided by an application function, and stored in the third network function. The edge application configuration may comprise at least one of: an identifier, a port, a protocol, a required QoS, a FQDN, and a location, for each of at least one server arranged for the application.

In embodiments of the present disclosure, the information of at least one server available for supporting the application may comprise at least one of: an IP address, a port, a protocol, a location and a load status, for each of the at least one server available for supporting the application.

In embodiments of the present disclosure, the global identifier of the terminal device may comprise: a generic public subscription identifier, GPSI, of the terminal device.

In embodiments of the present disclosure, the first network function may obtain the location of the terminal device, from a UDM, based on the global identifier of the terminal device. The first network function may determine the location of the terminal device, based on a mapping relationship between the location of the terminal device and the IP address of the terminal device.

In embodiments of the present disclosure, the first network function may comprise a network exposure function, NEF. The second network function may comprise a binding support function, BSF.

In embodiments of the present disclosure, the request may be originated from the terminal device, or a network function.

A second aspect of the present disclosure provides a method performed at a second network function. The method may comprise: receiving, from a first network function, an IP address of a terminal device, and transmitting, to the first network function, a global identifier of the terminal device, based on the IP address of the terminal device.

In embodiments of the present disclosure, the global identifier of the terminal device may comprise: a generic public subscription identifier, GPSI, of the terminal device.

In embodiments of the present disclosure, the first network function may comprise a network exposure function, NEF. The second network function may comprise a binding support function, BSF.

A third aspect of the present disclosure provides a method performed at a third network function. The method may comprise: receiving, from an application function, edge application configuration about an application, and storing the edge application configuration about the application. The edge application configuration may comprise at least one of: an identifier, a port, a protocol, a required quality of service, QoS, a fully qualified domain name, FQDN, and a location, for each of at least one server arranged for the application.

In embodiments of the present disclosure, the method may further comprise: transmitting, to a first network function, information of at least one server available for supporting an application, based on a location of a terminal device, a global identifier of the terminal device, and a fully qualified domain name, FQDN, of the application. The application may be requested by the terminal device. The information of at least one server available for supporting the application may comprise at least one of: an IP address, a port, a protocol, a location and a load status for each of the at least one server available for supporting the application.

In embodiments of the present disclosure, the first network function may comprise a network exposure function, NEF.

A fourth aspect of the present disclosure provides a first network function. The first network function may comprise: a processor; and a memory, the memory containing instructions executable by the processor, whereby the first network function may be operative to: receive, a request for querying information associated to a location of a terminal device. The request may include an internet protocol, IP, address of the terminal device. The first network function may be further operative to obtain, from a second network function, a global identifier of the terminal device, based on the IP address of the terminal device. The first network function may be further operative to obtain a location of the terminal device, based on the global identifier or the IP address of the terminal device. The first network function may be further operative to transmit information associated to the location of the terminal device.

In embodiments of the present disclosure, the first network function may be operative to perform the method according to any of embodiments of the first aspect.

A fifth aspect of the present disclosure provides a second network function. The second network function may comprise: a processor; and a memory, the memory containing instructions executable by the processor, whereby the second network function may be operative to: receive, from a first network function, an IP address of a terminal device; and transmit, to the first network function, a global identifier of the terminal device, based on the IP address of the terminal device.

In embodiments of the present disclosure, the second network function may be operative to perform the method according to any of embodiments of the second aspect.

A sixth aspect of the present disclosure provides a third network function. The third network function may comprise: a processor; and a memory, the memory containing instructions executable by the processor, whereby the third network function may be operative to: receive, from an application function, edge application configuration about an application, and store the edge application configuration about the application. The edge application configuration may comprise at least one of: an identifier, a port, a protocol, a required quality of service, QoS, a fully qualified domain name, FQDN, and a location, for each of at least one server arranged for the application.

In embodiments of the present disclosure, the third network function may be operative to perform the method according to any of embodiments of the third aspect.

A seventh aspect of the present disclosure provides a computer-readable storage medium storing instructions which when executed by at least one processor, cause the at least one processor to perform the method according to any one of embodiments of the first, second, third aspects.

According to embodiments of the present disclosure, as a response of the request including an IP address of a terminal device, a network function may provide information associated to the location of the terminal device. Then, various services, such as edge service, may be provided to the terminal device, based on the location of the terminal device.

Particularly, in embodiments of the present disclosure, as a response of the request of the terminal device, the terminal device may receive information about a server. The server may be determined based on the location of the terminal device and a unique global identifier of the terminal device. Thus, a manner about how to dynamically provide the edge service to the terminal device may be provided. Specifically, the response of the request may include IP address of a server for edge application, if the request includes FQDN of an edge application.

BRIEF DESCRIPTION OF DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 2A is an exemplary diagram showing a procedure for a UE to look up IP address AS;

FIG. 2B is another exemplary diagram showing a procedure for a UE to look up IP address AS;

FIG. 2C is still another exemplary diagram showing a procedure for a UE to look up IP address AS;

DETAILED DESCRIPTION

Figure 1A:
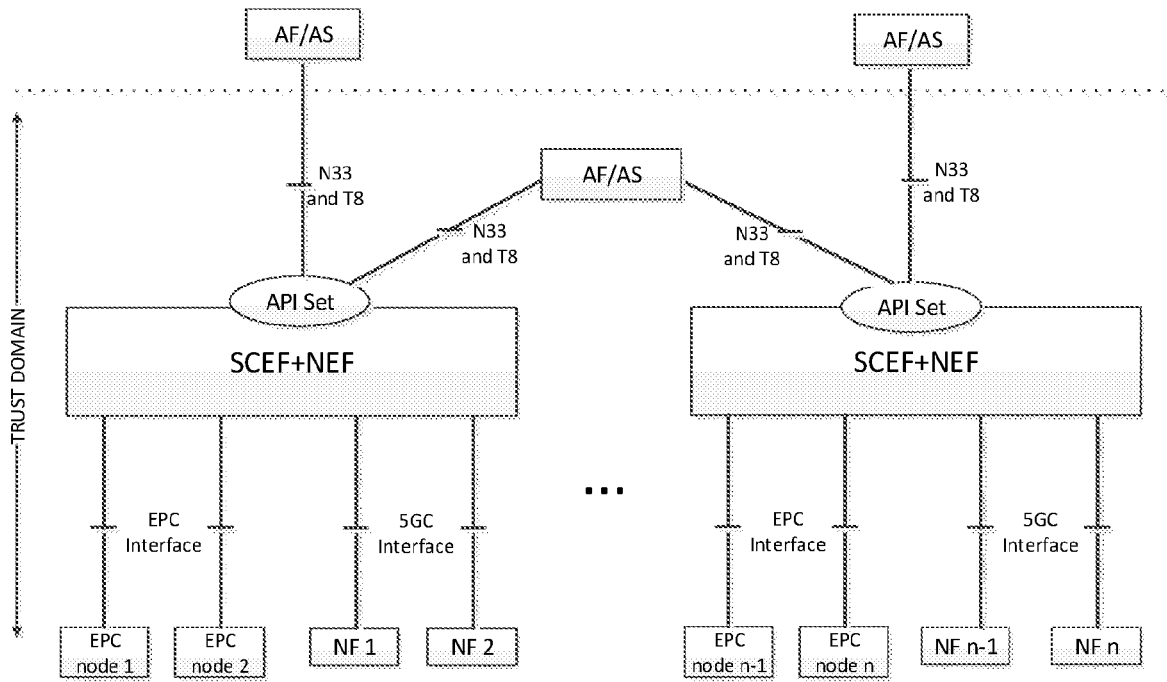
FIG. 1A is an exemplary diagram showing a structure for securely providing 3GPP network interfaces to external 3rd party servers.
Figure 1B:
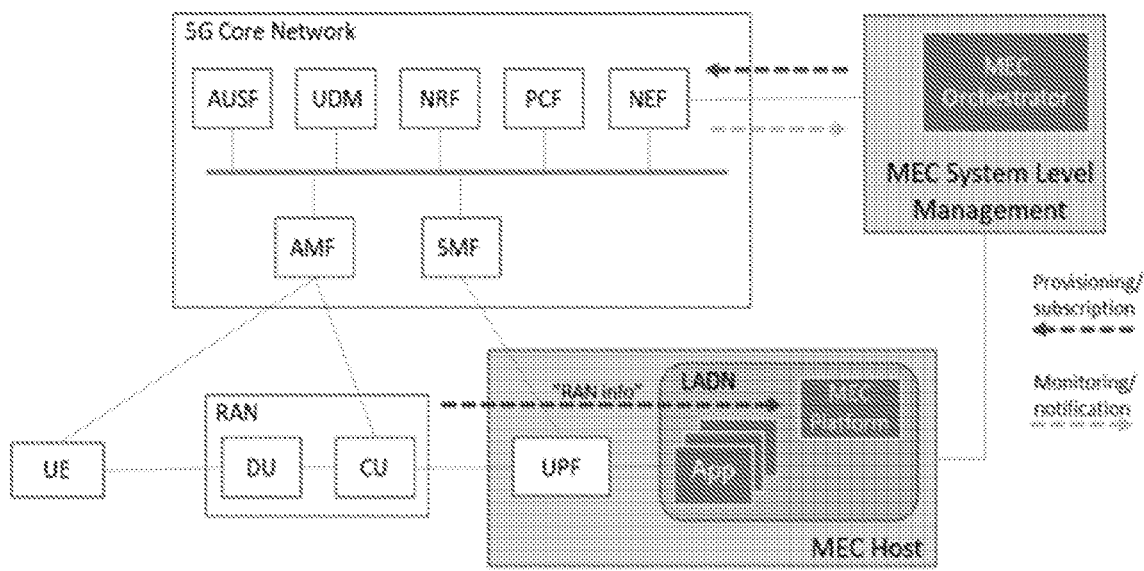
FIG. 1B is an exemplary diagram showing a high-level architecture of Capability Exposure for edge computing.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the term "network" or "communication network" refers to a network following any suitable wireless communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols.

The term "network function (NF)", "network node" used herein refers to a network device or network entity or any other devices (physical or virtual) in a communication network. For example, the network node in the network may include a base station (BS), an access point (AP), a multi-cell/multicast coordination entity (MCE), a server node/function (such as a service capability server/application server, SCS/AS, group communication service application server, GCS AS, application function, AF), an exposure node/function (such as a service capability exposure function, SCEF, network exposure function, NEF), a unified data management, UDM, a home subscriber server, HSS, a session management function, SMF, an access and mobility management function, AMF, a mobility management entity, MME, a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node may comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like.

Further, the term "network function" may also refer to any suitable function model/unit which can be implemented in a network entity (physical or virtual) of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), etc. In other embodiments, the network function may comprise different types of NFs (such as PCRF (Policy and Charging Rules Function), etc.) for example depending on the specific network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and (or) B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Just as an example, a procedure for a terminal device to obtain the IP address of a server for application/computing will be illustrated at first. It is a precondition for the UE to receive any service, such as edge service, from the server.

Figure 2A:
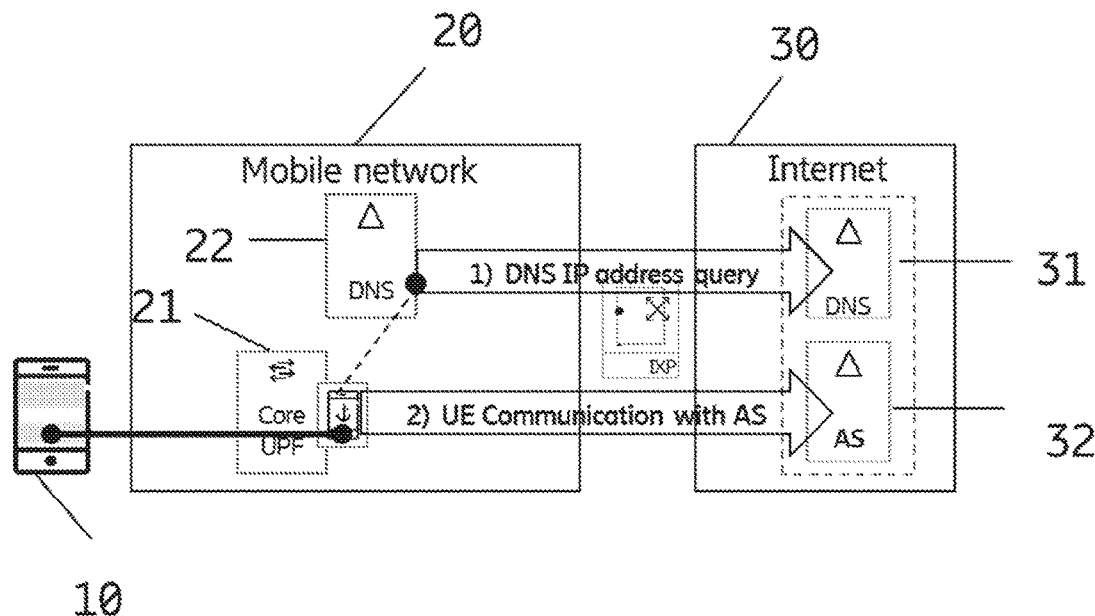
Figure 2B:
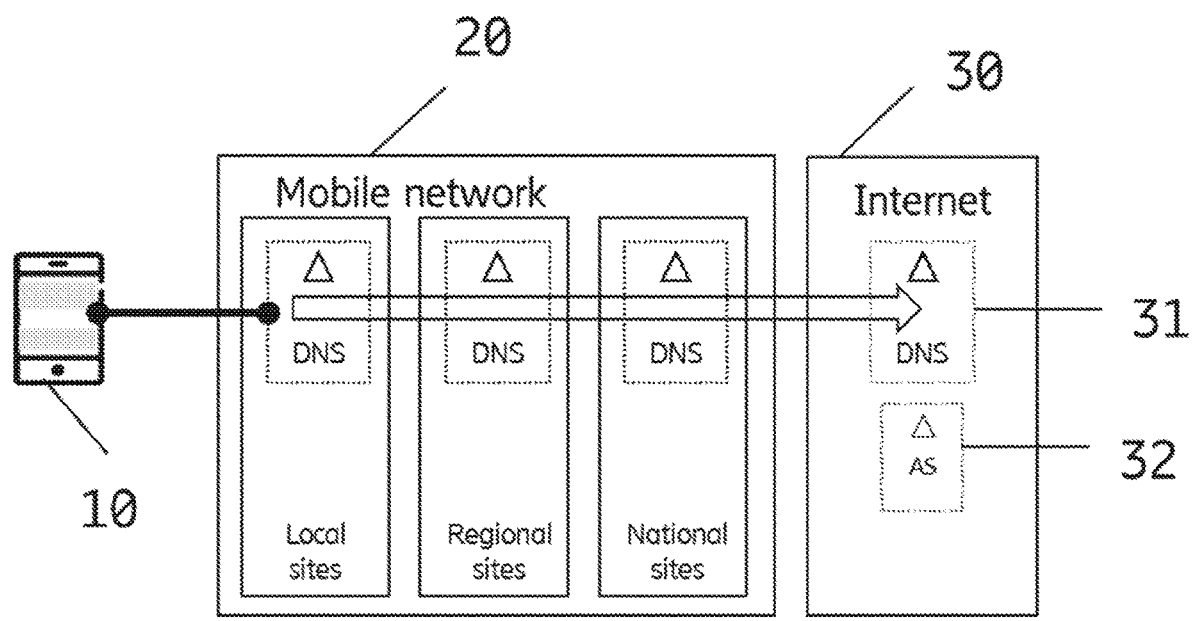
Figure 2C:
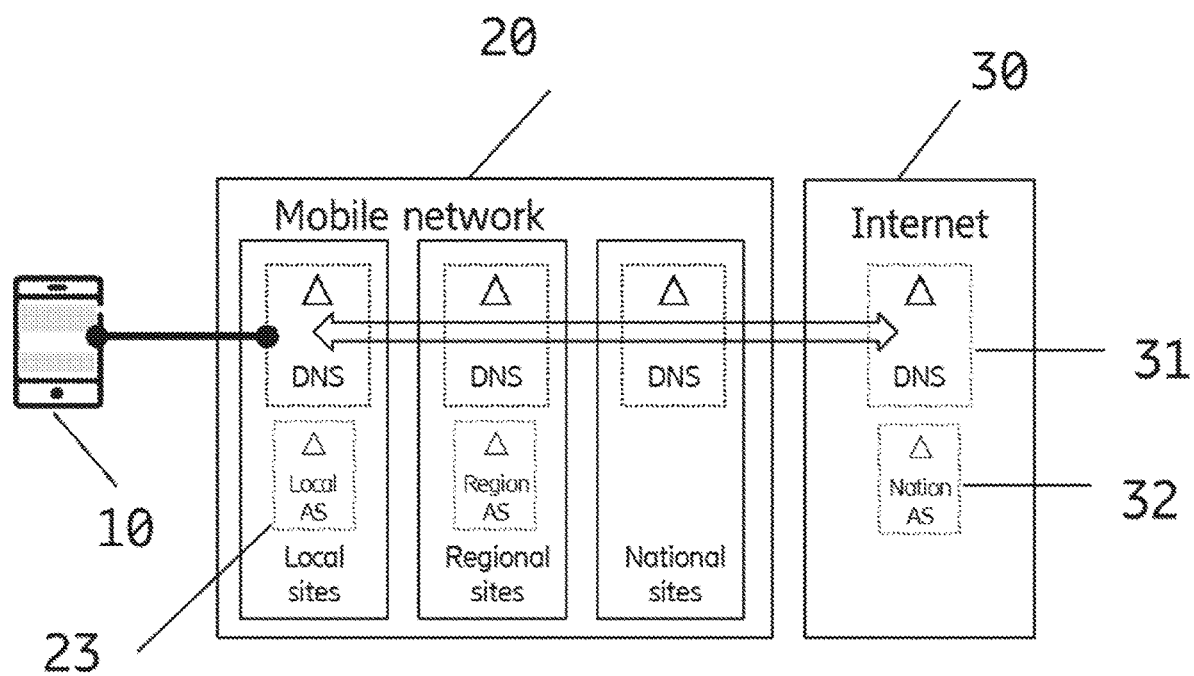

FIG. 2A is an exemplary diagram showing a procedure for a UE to look up IP address AS; FIG. 2B is another exemplary diagram showing a procedure for a UE to look up IP address AS; FIG. 2C is still another exemplary diagram showing a procedure for a UE to look up IP address AS.

FIG. 2A and FIG. 2B demonstrate the normal (non-edge) solution for a terminal device, such as a user equipment, UE, to look up IP address of application server (AS). UE 10 firstly use FQDN to query the AS IP address from domain name server, DNS, 22 in the Mobile network 20. In particularly, the Mobile Network may have three layers of DNS (e.g. in local sites, regional sites, and national sites). Further, as shown in step 1), if FQDN lookup can't be handled by Mobile Network's DNS 22, Mobile network DNS 22 will finally ask Internet DNS 31 in the internet. Then, in step 2), the UE may communicate with AS 32, via the core UPF 21 in the mobile network. IXP refers to Internet Exchange Point.

As shown in FIG. 2C, in edge computing, the AS 23 may be deployed in Local sites or Regional sites. When UE uses FQDN to look up IP address, it expects that the DNS can response the IP address of local AS or regional AS. However, the local DNS in the mobile network do not have relating capability to directly provide such information about the IP address of local application server. The DNS in the internet have to be involved, for indicating the local AS 23. The efficiency may be reduced.

Namely, how to let UE to find IP address of local AS or Region AS dynamically is a question.

Figure 2D:
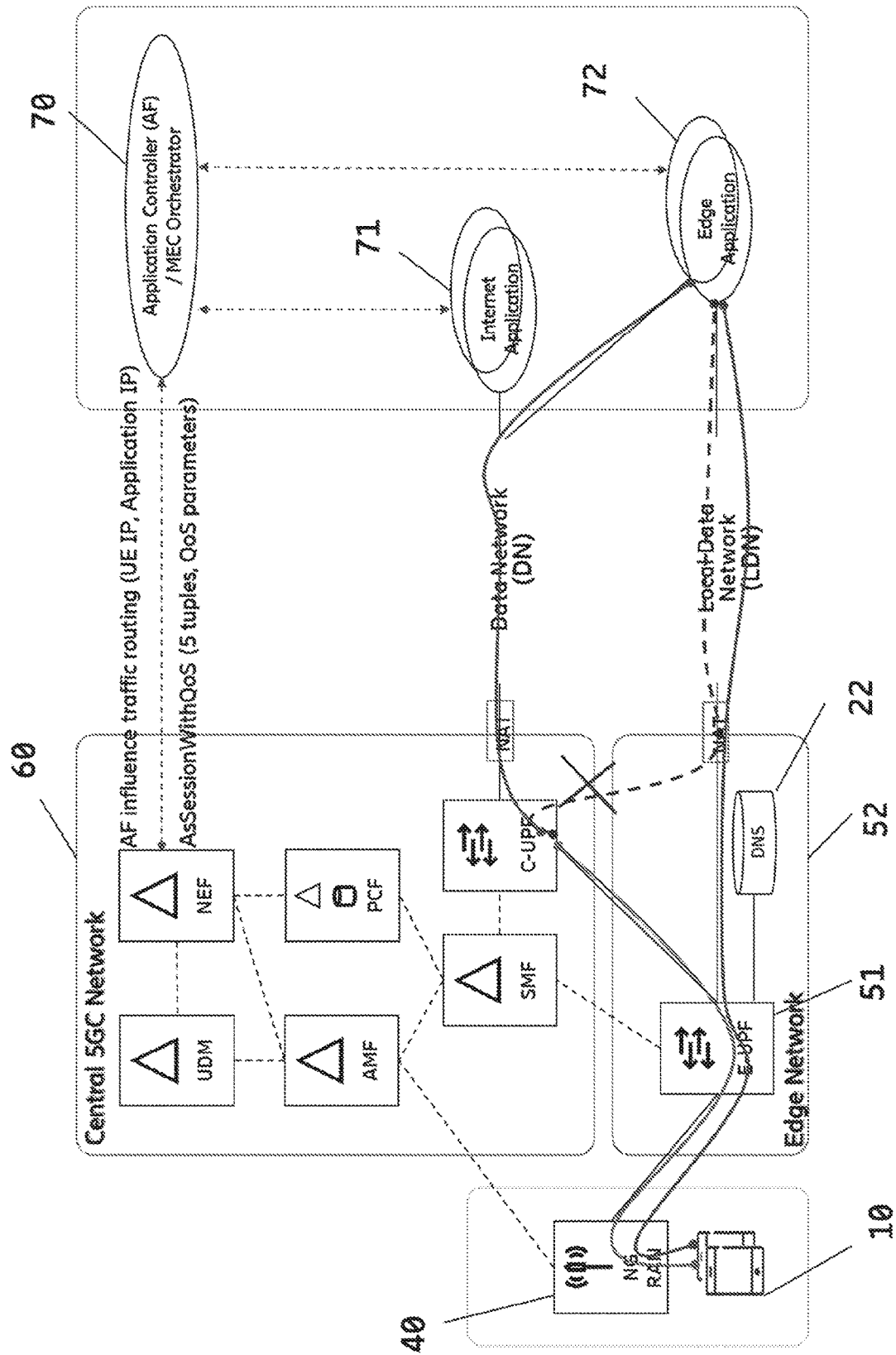
FIG. 2D is an exemplary diagram showing a transmission path between the UE and the application server.

FIG. 2D is an exemplary diagram showing a transmission path between the UE and the application server.

The data transmission path may originate from the UE 10, through next generation radio access network, NG RAN 40, to the E-UPF 51 in the edge network 52. Then, a default situation is that the path goes to C-UPF in the central 5GC network 60.

That is, even after UE get IP address of local AS or Region AS (as the edge application 72) by any manner, UE 10 may still not communicate with the local AS directly, since by default, UE PDU session will still anchor on central UPF (with a communication path between UE 10, E-UPF 51, and C-UPF). E-UPF refers to edge UPF, C-UPF refers to central/core UPF. The central UPF may not be able to route the UE's traffic to edge application directly (with a relative short communication path between UE, E-UPF, and edge application server). And thus the UE traffic have to take even longer path to communicate with edge application 72 (going through the internet and back to the edge application server again) than to communicate with internet application 71 (without need to go back to the edge application server).

As one possible solution, 3GPP introduces a new network capability exposed by NEF to AF 70 (Application Controller/MEC orchestrator), which allows AF to influence UPF (re)selection and traffic routing (between UE, E-UPF, and edge application server). In such procedure, an internal IP address in the local/edge network is necessary.

However, as the UPF probably has Network Address Translation, NAT, for the UE IP address, so how to get the UE IP address (internal IP address in the local/edge network) by Application Controller (AF) 70 is always the question.

Figure 3A:
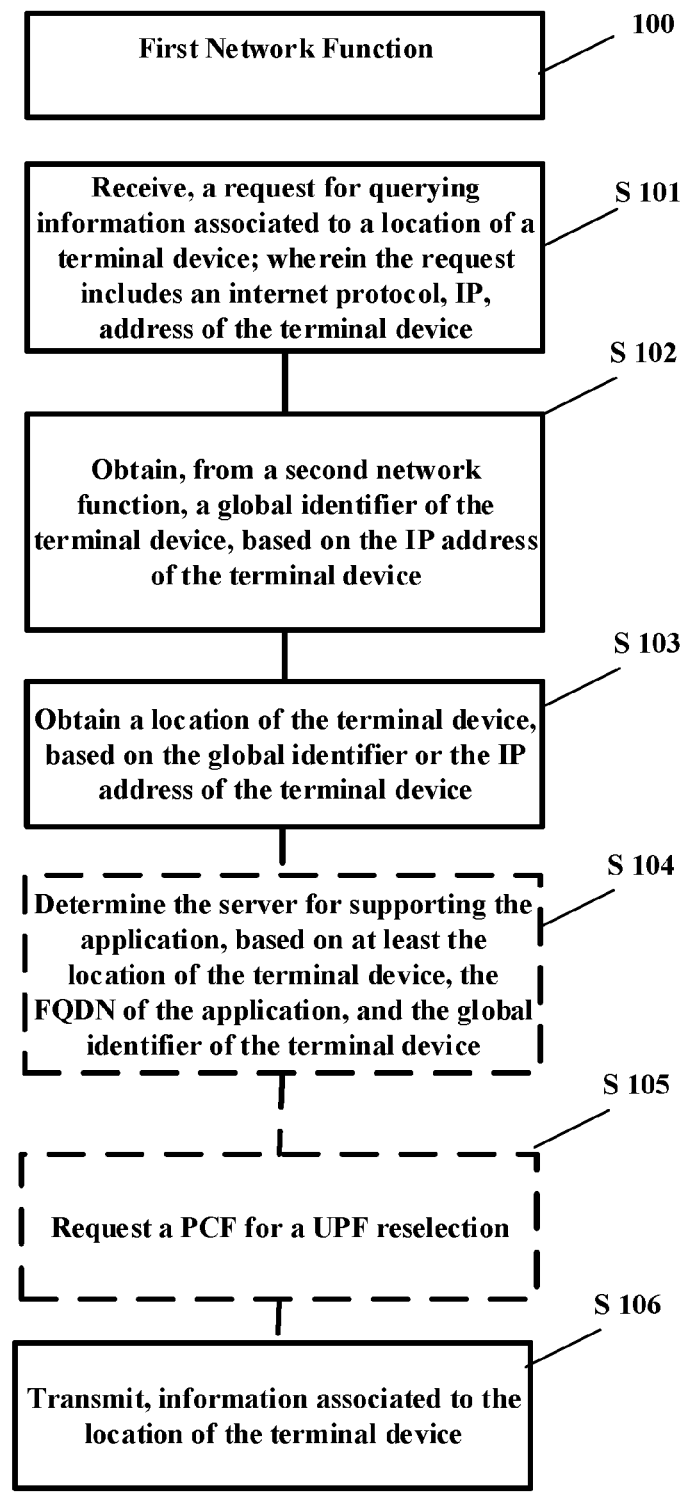
FIG. 3A is an exemplary flowchart of a method performed at a first network function for providing edge service, according to embodiments of the present disclosure.

FIG. 3A is an exemplary flowchart of a method performed at a first network function for providing edge service, according to embodiments of the present disclosure.

As shown FIG. 3A, a method performed at a first network function, comprises: S101 receiving, a request for querying information associated to a location of a terminal device, wherein the request includes an internet protocol, IP, address of the terminal device; S102, obtaining, from a second network function, a global identifier of the terminal device, based on the IP address of the terminal device; S103, obtaining a location of the terminal device, based on the global identifier or the IP address of the terminal device; S106, transmitting, information associated to the location of the terminal device.

According to embodiments of the present disclosure, as a response of the request including an IP address of a terminal device, a network function may provide information associated to the location of the terminal device. Then, various services, such as edge service, may be provided to the terminal device, based on the location of the terminal device.

In embodiments of the present disclosure, the request may be for querying the location of the terminal device. The transmitted information may include the location of the terminal device.

According to embodiments of the present disclosure, it is particularly efficient for another network/application function for querying the location of the terminal device, based on the IP address of the terminal device.

For example, a terminal device may be connected to a server, and thus the server knows the IP address of the terminal device. The server may want to actively obtain the location of the terminal device to trigger edge service, etc., while not further disturb the terminal device itself.

In embodiments of the present disclosure, the request may be for querying an IP address of a server for supporting an application. The request may further include a fully qualified domain name, FQDN, of the application. The method may further comprise: determining the server for supporting the application, based on at least the location of the terminal device, the FQDN of the application, and the global identifier of the terminal device. The transmitted information may include an IP address of the determined server.

In embodiments of the present disclosure, the method further comprise: requesting a policy control function, PCF, for a user plane function, UPF, reselection.

In embodiments of the present disclosure, the first network function may use a procedure of application function influence traffic routing for requesting UPF reselection.

According to embodiments of the present disclosure, as a response of the request of the terminal device, the terminal device receives information about a server. The server may be determined based on the location of the terminal device and a unique global identifier of the terminal device. Thus, a manner about how to dynamically provide the edge service to the terminal device may be provided.

Particularly, since the UE can be uniquely indicated by the GPSI, the efficiency and accuracy for determining the server may be improved. Further, a UPF reselection procedure may be performed to prepare the connection between the terminal device and the server.

In embodiments of the present disclosure, the global identifier of the terminal device comprises: a generic/general public subscription identifier, GPSI, of the terminal device. In embodiments of the present disclosure, the first network function comprises a network exposure function, NEF; and/or the second network function comprises a binding support function, BSF.

It should be understood, any unique identifier for the terminal device, such as subscription permanent identifier, SUPI, international mobile subscriber identifier, IMSI, may be applicable. Or sometimes, even the IP address of the terminal device is applicable, only if the IP address is unique in the internet level.

In embodiments of the present disclosure, the first network function obtains the location of the terminal device, from a UDM, based on the global identifier of the terminal device; and/or the first network function determines the location of the terminal device, based on a mapping relationship between the location of the terminal device and the IP address of the terminal device.

In embodiments of the present disclosure, the request may be originated from the terminal device, or a network function.

Figure 3B:
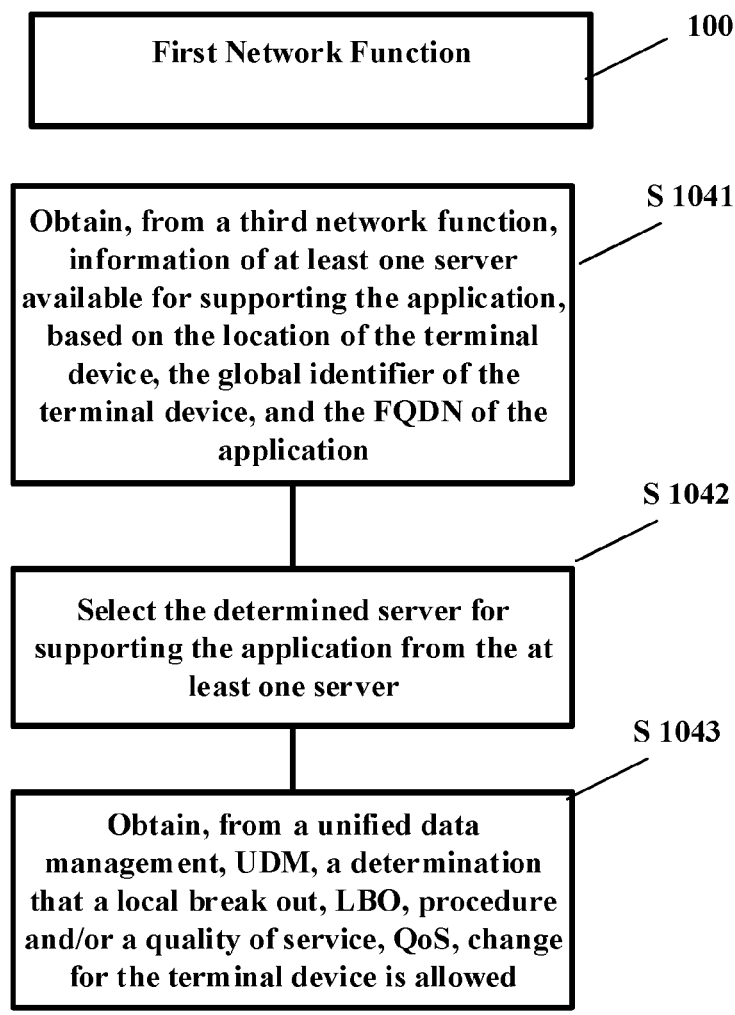
FIG. 3B is an exemplary flowchart illustrating sub steps of the method shown in FIG. 3A, according to embodiments of the present disclosure.

FIG. 3B is an exemplary flowchart illustrating sub steps of the method shown in FIG. 3A, according to embodiments of the present disclosure.

In embodiments of the present disclosure, S104, determining the server for supporting the application comprises: S1041, obtaining, from a third network function, information of at least one server available for supporting the application, based on the location of the terminal device, the global identifier of the terminal device, and the FQDN of the application; S1042, selecting the determined server for supporting the application from the at least one server; S1043, obtaining, from a unified data management, UDM, a determination that a local break out, LBO, procedure and/or a quality of service, QoS, change for the terminal device is allowed.

In embodiments of the present disclosure, the information of at least one server available for supporting the application comprises at least one of: an IP address, a port, a protocol, a location and a load status, for each of the at least one server available for supporting the application.

According to embodiments of the present disclosure, based on local policy, the first network function 100 may be able to dynamically select a server when there are more than one applicable servers. The selected server may have the best QoS capability, or least latency, or lowest load level, or be closest to the terminal device, etc.

In embodiments of the present disclosure, the determined server is in an edge network to which the terminal device is connected; the terminal device is connected to the determined server via an edge UPF in the edge network, during the LBO procedure; a request from the first network function to PCF for UPF reselection includes at least one of: the IP address of the terminal device, the IP address of the determined server, a port for the application and a protocol for the application.

According to embodiments of the present disclosure, the (edge) server in the edge network, such as the local sites or regional sites of the terminal device, may be selected. Further, the terminal device may be connected to the edge server through an edge UPF, without going through the internet. The efficiency is further improved.

In embodiments of the present disclosure, an edge application configuration is provided by an application function, and stored in the third network function; and the edge application configuration comprises at least one of: an identifier, a port, a protocol, a required QoS, a FQDN, and a location, for each of at least one server arranged for the application.

According to embodiments of the present disclosure, an application function, such as a third party MEC orchestrator may previously store edge application configuration relating to edge computing/service/application in the core network of the communication system. Therefore, during the procedure of determining edge server, the third party MEC orchestrator is not necessary to be involved. The efficiency and the security may be further improved.

Figure 4:
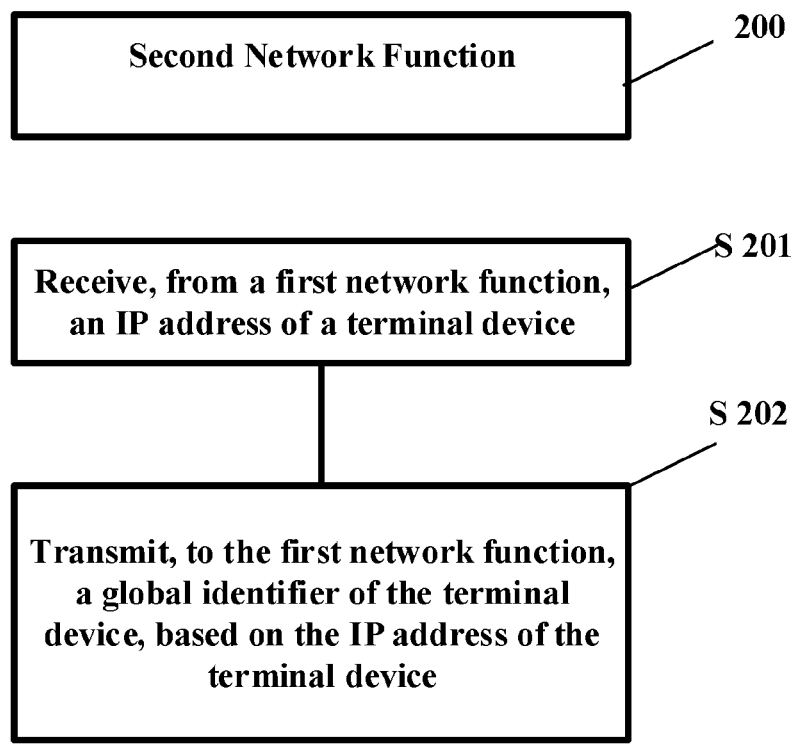
FIG. 4 is an exemplary flowchart of a method performed at a second network function for providing edge service, according to embodiments of the present disclosure.

FIG. 4 is an exemplary flowchart of a method performed at a second network function for providing edge service, according to embodiments of the present disclosure.

As shown in FIG. 4, the method performed at a second network function 200 comprises: S201, receiving, from a first network function, an IP address of a terminal device; and S202, transmitting, to the first network function, a global identifier of the terminal device, based on the IP address of the terminal device.

In embodiments of the present disclosure, the global identifier of the terminal device comprises: a generic public subscription identifier, GPSI, of the terminal device. In embodiments of the present disclosure, the first network function comprises a network exposure function, NEF; and/or the second network function comprises a binding support function, BSF.

According to embodiments of the present disclosure, the BSF may be enhanced to provide the GPSI to the NEF directly. The efficiency may be improved.

Figure 5A:
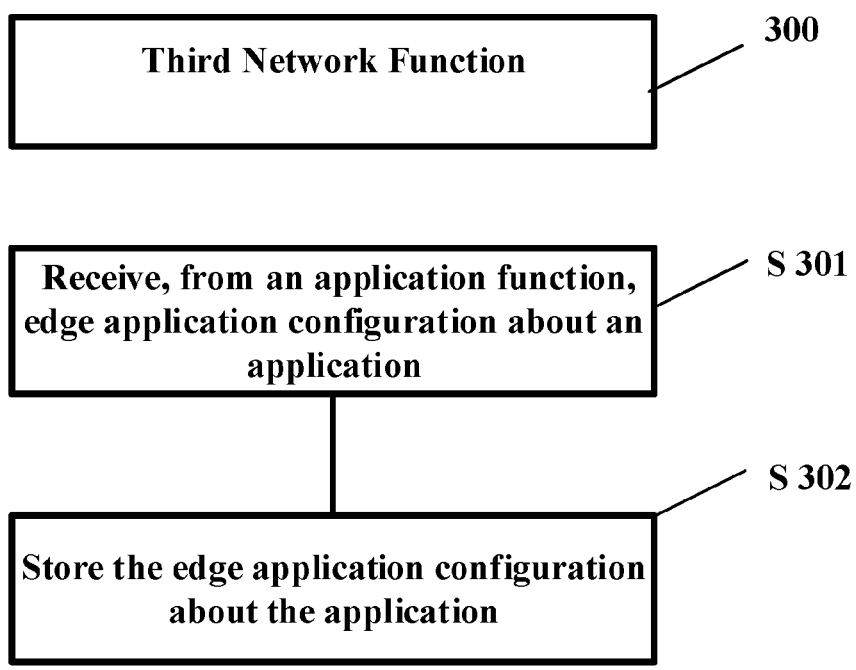
FIG. 5A is an exemplary flowchart of a method performed at a third network function for providing edge service, according to embodiments of the present disclosure.

FIG. 5A is an exemplary flowchart of a method performed at a third network function for providing edge service, according to embodiments of the present disclosure.

A third aspect of the present disclosure provides a method performed at a third network function 300, comprising: S301, receiving, from an application function, edge application configuration about an application; and S302, storing the edge application configuration about the application. The edge application configuration comprises at least one of: an identifier, a port, a protocol, a required quality of service, QoS, a fully qualified domain name, FQDN, and a location, for each of at least one server arranged for the application.

According to embodiments of the present disclosure, an application function, such as a third party MEC orchestrator may previously store edge application configuration relating to edge computing/service/application in third network function 300. Therefore, during the procedure of determining edge server, the third party MEC orchestrator is not necessary to be involved. The efficiency and the security may be further improved.

Figure 5B:
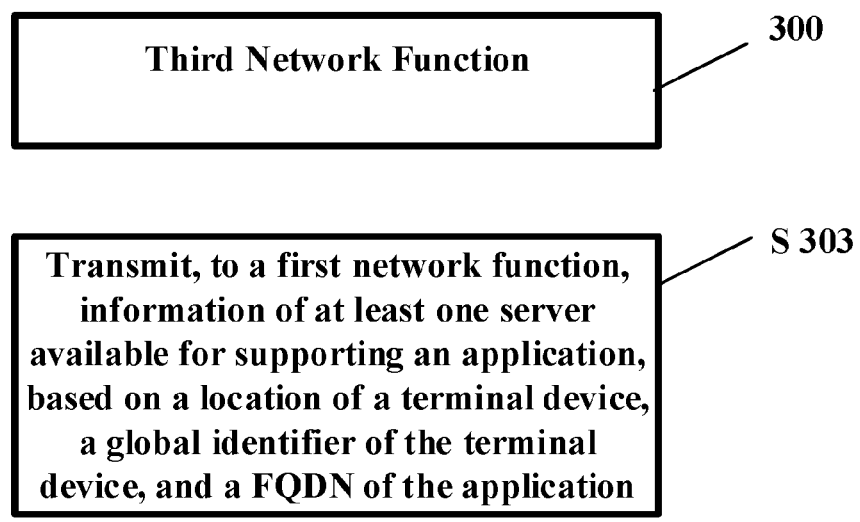
FIG. 5B is an exemplary flowchart illustrating additional steps of the method shown in FIG. 5A, according to embodiments of the present disclosure.

FIG. 5B is an exemplary flowchart illustrating additional steps of the method shown in FIG. 5A, according to embodiments of the present disclosure.

In embodiments of the present disclosure, the method further comprises: S303, transmitting, to a first network function, information of at least one server available for supporting an application, based on a location of a terminal device, a global identifier of the terminal device, and a fully qualified domain name, FQDN, of the application. The application is requested by the terminal device; and the information of at least one server available for supporting the application comprises at least one of: an IP address, a port, a protocol, a location and a load status for each of the at least one server available for supporting the application.

In embodiments of the present disclosure, the first network function comprises a network exposure function, NEF.

According to embodiments of the present disclosure, the third network function 300 may be able to provide more than one applicable candidate server, so as to improve the flexibility for determining the server for the terminal device.

Therefore, the embodiments of the present disclosure is particularly applicable to provide a solution for UE to look up IP address of local AS or Region AS, also to simplify the solution to help/replace AF to influence the UPF (re)selection and traffic routing.

That is, improved solution to utilize the 5G network capabilities to simplify the edging computing solution is proposed, and no central AF from internet is involved to LBO the traffic of UE.

Figure 6:
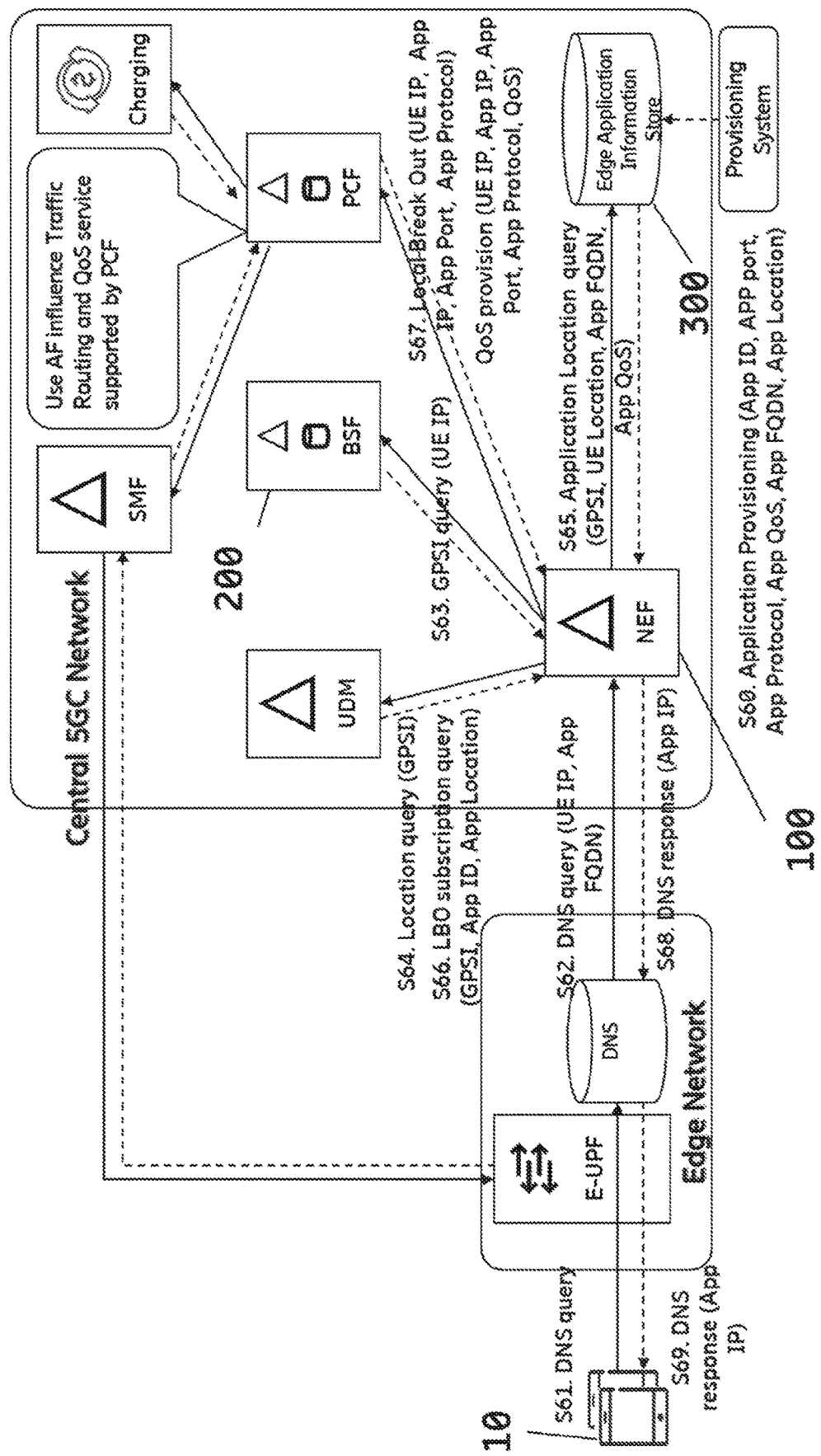
FIG. 6 is a schematic diagram showing an overall procedure for providing information about edge server to the terminal device, according to embodiments of the present disclosure.

FIG. 6 is a schematic diagram showing an overall procedure for providing information about edge server to the terminal device, according to embodiments of the present disclosure.

As show in FIG. 6, an exemplary overall procedure for providing the edge information (particularly the IP address of the edge application server) will be illustrated.

In step S60, the Edge Application Information and QoS Policy for UE to communication with edge application is provisioned into "Edge Application Information Store". The provisioning information may include at least one of: Application ID, Application Port, Application Protocol, Application required QoS, Application FQDN, Application location, etc.

Such information may be from any kind of provisioning system, such as directly from the application controller operated by the application service provider, particularly a 3rd party service provider.

The "Edge Application Information Store" may be implemented as a new designed function/unit, which is in or connectable to the 5GC network, or may be just implemented as part of any existing function/unit with data storing capability in the 5GC network, such as a UDM.

In step S61, UE sends DNS query (e.g. a FQDN query) to look up the IP address of Application. The DNS query will be forwarded to Mobile Edge Network's DNS Server.

In step S62, the Edge Network DNS Server will send DNS query (e.g. a FQDN query) request to NEF, which include UE internal IP (without NAT) and Application's FQDN. There could be a specific interface exposed by NEF for DNS Server to transmit this DNS query (e.g. a FQDN query) request.

Alternatively or additionally, NEF may expose an interface for other application/network function to query UE location based on UE IP address.

In step S63, the NEF will query the BSF to get the GPSI based on UE IP address. In embodiments of the present disclosure, there could also be a specific BSF interface to allow BSF return the GPSI to NEF, when NEF query BSF using UE (internal) IP address.

In step S64, after obtaining the UE GPSI, NEF queries UDM for the UE location, or NEF itself detects the UE location based on UE IP address. Either NEF stores the mapping between the UE IP address and location inside NEF, or NEF queries another function or even external system to find such mapping for detecting the UE location.

In an embodiment, the NEF may get the UE location directly from the UDM. This will be efficient. Alternatively, when NEF can't get UE location from UDM query response directly, the UDM may forward the query to AMY, and in turn AMF may notify NEF bypassing UDM for the UE location.

In step S65, when NEF send an application query with UE GPSI, UE location and Application FQDN to AIS, AIS may return one/several applicable applications including application IP address, port, protocol, location and load status. In embodiments of the present disclosure, the Application Information Store (AIS) may be provided by the operator, and the AIS stores the edge application information including application IP address, application port, application protocol, application location, application load status.

In step S66, the NEF may filter the applicable applications based on local policy and then send Local Break Out (LBO) request and QoS change request to UDM with UE IP address, Application ID and Application Location. For example, according to the local policy, among several applicable applications, the NEF may select an application closet to the UE in spatial relationship.

UDM should validate if the UE can be LBO to the specific location or change QoS for the request application. That is, in embodiments, the UDM may be configured to support LBO subscription, and QoS subscription handling.

In step S67, if UDM allow UE to LBO for the traffic, NEF will trigger the LBO or QoS change request to PCF to influence the UPF (re)selection, the request include UE IP address, Application IP address, Application port and Application protocol. At least part of the information in that request are obtained from BSF in step S63, such as part of tuples, QoS parameters, etc.

In embodiments of the present disclosure, the NEF will reuse the procedure for the AF influence Traffic Routing (See 3GPP TS 23.501, 3GPP TS 23.503 V16.4.1 (2020 April), etc.). Alternatively, one improvement of the embodiments of the present disclosure is that AF may not be actually involved in that phase, since NEF already has all necessary information to trigger the PCF. The communication and required interfaces between the 5G core network and the third party entity may be reduced.

In step S68, the NEF responses the original DNS query (e.g. a FQDN query) with selected Application IP address to DNS server.

In step S69, the DNS server response the Application IP address to UE. When UE gets Application IP address and communicates with application, the LBO may be actually performed, because in step S67 the traffic routing policy has been applied by NEF. It should be understood, without any difference to the UE, the IP address may be related to a physical application server, or virtual application server.

According to the above specific embodiment of the present disclosure, the BSF is enhanced with an interface to provide UE GPSI information for NEF query, and then the UE GPSI may be used by the NEF for obtain the location of UE, and applicable applications for the UE. The NEF may be also enhanced to identify the UE coarse grain location based on UE IP address. Then UDM is enhanced to store the UE LBO subscription and UE QoS subscription, then UDM can detect if the UE can be LBO or not, and may change QoS or not, based on the subscription information. The NEF may further trigger LBO and QoS change for UE.

Therefore, rather than the third party entity, such as the application function, the NEF obtains the UE IP address, particularly the internal IP address. The internal IP address needs not to be transferred outside to the internet, both the efficiency and the security are improved.

Further, a UE GPSI may be used by the NEF to obtain a relative accurate UE location from UDM. The NEF may also obtain information of at least one applicable applications for the UE, from the Edge Application Information Store/Database, based on the location of UE, and the UE GPSI. Since the UE can be uniquely indicated by the GPSI, the efficiency and accuracy for finding the at least one applicable applications may be improved.

Additionally, since the NEF inside the 5GC network, rather than an outside third party application function, may actively trigger the LBO and QoS change for UE, both the efficiency and the security of the system may be further improved, and the processing and/or communication load of the application function may be reduced.

Figure 7:
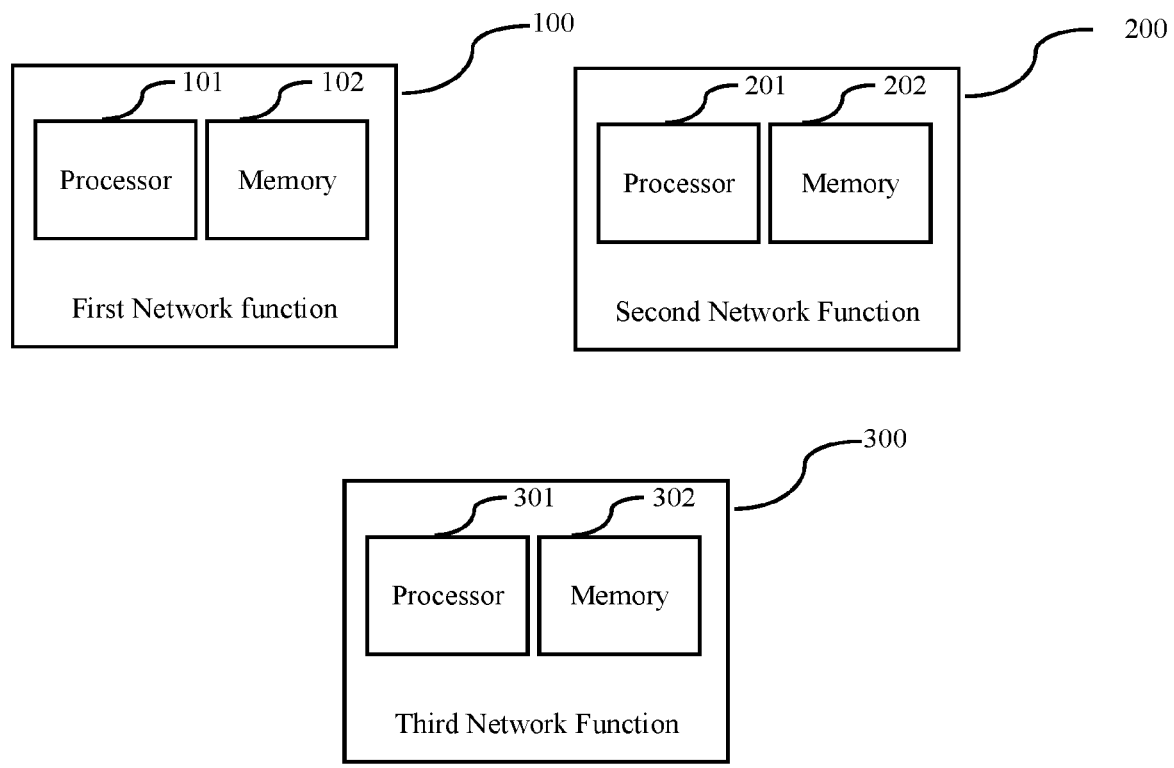
FIG. 7 is a block diagram showing exemplary apparatuses suitable for practicing the network functions according to embodiments of the disclosure.

FIG. 7 is a block diagram showing exemplary apparatuses suitable for practicing the network functions according to embodiments of the disclosure.

As shown in FIG. 7, the first network function 100 comprises: a processor 101; and a memory 102, the memory 102 containing instructions executable by the processor 101, whereby the first network function 100 is operative to: receive, a request originated from a terminal device for querying an internet protocol, IP, address of a server for supporting an application, wherein the request includes a fully qualified domain name, FQDN, of the application, and an IP address of the terminal device; obtain, from a second network function, a global identifier of the terminal device, based on the IP address of the terminal device; obtain a location of the terminal device, based on the global identifier or the IP address of the terminal device; determine the server for supporting the application, based on at least the location of the terminal device, the FQDN of the application, and the global identifier of the terminal device; request a policy control function, PCF, for a UPF reselection; and transmit, to the terminal device, information of the determined server including the IP address of the determined server.

In embodiments of the present disclosure, the first network function 100 is operative to perform the method according to any of the above embodiments, such as these shown in FIG. 3A-3B.

As shown in FIG. 7, the second network function 200 may comprise: a processor 201; and a memory 202. The memory 202 contains instructions executable by the processor 201, whereby the terminal device is operative to: receive, from a first network function, an IP address of a terminal device; and transmit, to the first network function, a global identifier of the terminal device, based on the IP address of the terminal device.

In embodiments of the present disclosure, the second network function 200 is operative to perform the method according to any embodiment of the above embodiments, such as these shown in FIG. 4.

As shown in FIG. 7, the third network function 300 may comprise: a processor 301; and a memory 302. The memory 302 contains instructions executable by the processor 301, whereby the terminal device is operative to: receive, from an application function, edge application configuration about an application; and store the edge application configuration about the application. The edge application configuration comprises at least one of: an identifier, a port, a protocol, a required quality of service, QoS, a fully qualified domain name, FQDN, and a location, for each of at least one server arranged for the application.

In embodiments of the present disclosure, the third network function 300 is operative to perform the method according to any of the above embodiments, such as these shown in FIG. 5A-5B.

The processors 101, 201, 301 may be any kind of processing component, such as one or more microprocessor or microcontrollers, as well as other digital hardware, which may include digital signal processors (DSPs), special-purpose digital logic, and the like. The memories 102, 202, 302 may be any kind of storage component, such as read-only memory (ROM), random-access memory, cache memory, flash memory devices, optical storage devices, etc.

Figure 8:
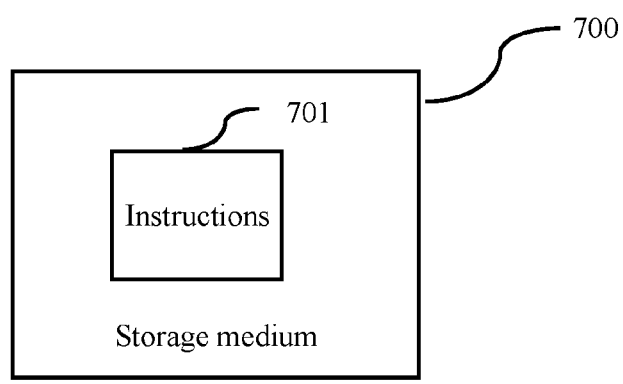
FIG. 8 is a block diagram showing an apparatus readable storage medium, according to embodiments of the present disclosure.

FIG. 8 is a block diagram showing an apparatus readable storage medium, according to embodiments of the present disclosure.

As shown in FIG. 8, the computer-readable storage medium 700, or any other kind of product, storing instructions 701 which when executed by at least one processor, cause the at least one processor to perform the method according to any one of the above embodiments, such as these shown in FIG. 3A-5B.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

Figure 9:
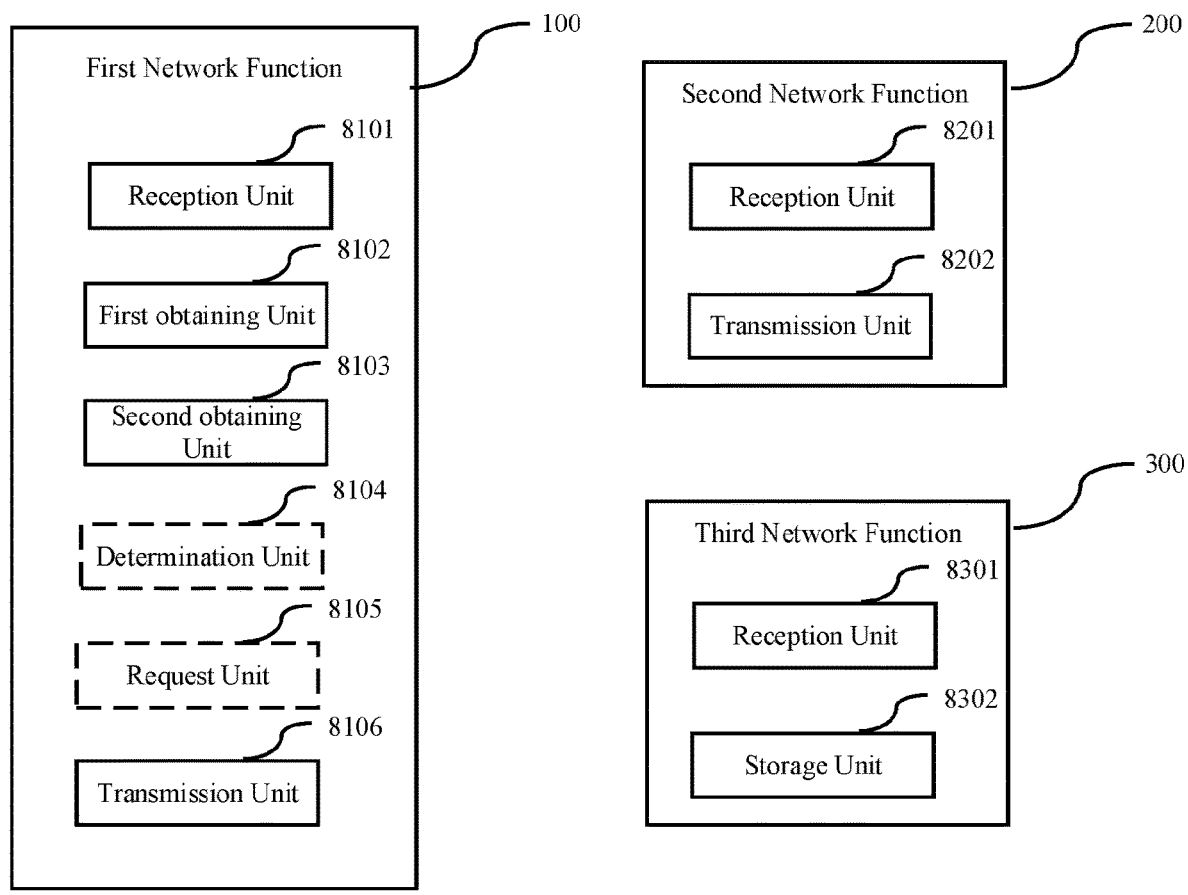
FIG. 9 is a schematic showing units for the network functions, according to embodiments of the present disclosure.

FIG. 9 is a schematic showing units for the network functions, according to embodiments of the present disclosure.

As shown in FIG. 9, the first network function 100 comprises: a reception unit 8101, configured to receive, a request originated from a terminal device for querying an internet protocol, IP, address of a server for supporting an application, wherein the request includes a fully qualified domain name, FQDN, of the application, and an IP address of the terminal device; a first obtaining unit 8102, configured to obtain, from a second network function, a global identifier of the terminal device, based on the IP address of the terminal device; a second obtaining unit 8103, configured to obtain a location of the terminal device, based on the global identifier or the IP address of the terminal device; a determination unit 8104, configured to determine the server for supporting the application, based on at least the location of the terminal device, the FQDN of the application, and the global identifier of the terminal device; a request unit 8105, configured to request a policy control function, PCF, for a UPF reselection; and a transmission unit 8106, configured to transmit, to the terminal device, information of the determined server including the IP address of the determined server.

In embodiments of the present disclosure, the first network function 100 is operative to perform the method according to any of the above embodiments, such as these shown in FIG. 3A-3B.

As shown in FIG. 9, the second network function 200 may comprise: a reception unit 8201, configured to receive, from a first network function, an IP address of a terminal device; and a transmission unit 8201, configured to transmit, to the first network function, a global identifier of the terminal device, based on the IP address of the terminal device.

In embodiments of the present disclosure, the second network function 200 is operative to perform the method according to any embodiment of the above embodiments, such as these shown in FIG. 4.

As shown in FIG. 9, the third network function 300 may comprise: a reception unit 8301, configured to receive, from an application function, edge application configuration about an application; and a storage unit 8302, configured to store the edge application configuration about the application. The edge application configuration comprises at least one of: an identifier, a port, a protocol, a required quality of service, QoS, a fully qualified domain name, FQDN, and a location, for each of at least one server arranged for the application.

In embodiments of the present disclosure, the third network function 300 is operative to perform the method according to any of the above embodiments, such as these shown in FIG. 5A-5B.

The term 'unit' may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the first network function 100, the second network function 200, the third network function 300 may not need a fixed processor or memory, any computing resource and storage resource may be arranged from at least one network node/device/entity/apparatus relating to the communication system. The virtualization technology and network computing technology (e.g. cloud computing) may be further introduced, so as to improve the usage efficiency of the network resources and the flexibility of the network.

Particularly, these network functions, e.g. the first network function 100, the second network function 200, the third network function 300, may be implemented either as a network element on a dedicated hardware, as a software instance running on a dedicated hardware, or as a virtualized function instantiated on an appropriate platform, e.g. on a cloud infrastructure.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Particularly, these function units may be implemented either as a network element on a dedicated hardware, as a software instance running on a dedicated hardware, or as a virtualized function instantiated on an appropriate platform, e.g. on a cloud infrastructure.

Figure 10:
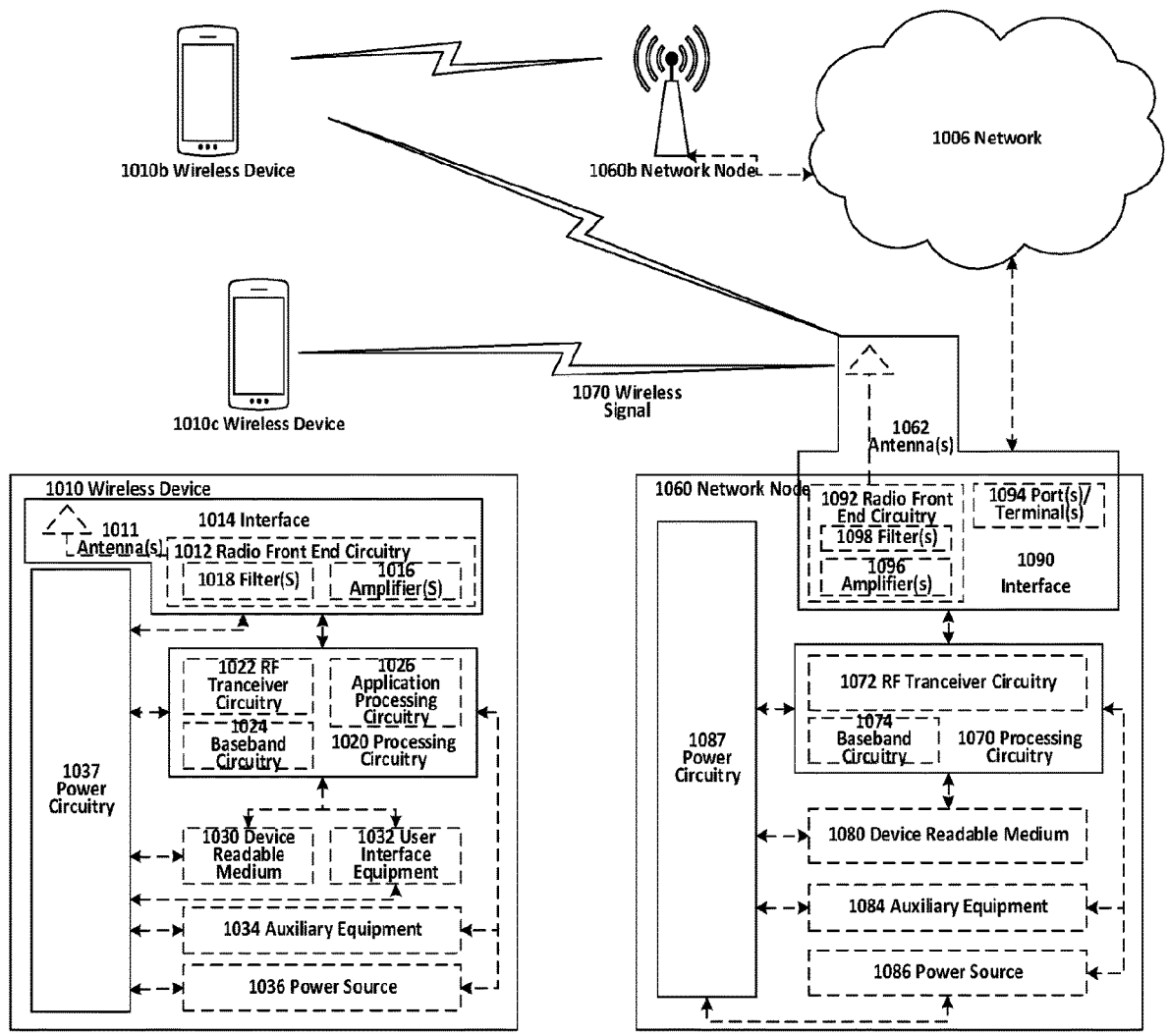
FIG. 10 is a schematic showing a wireless network in accordance with some embodiments.

FIG. 10 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 (corresponding to network side node) and 1060b, and WDs (corresponding to terminal device) 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
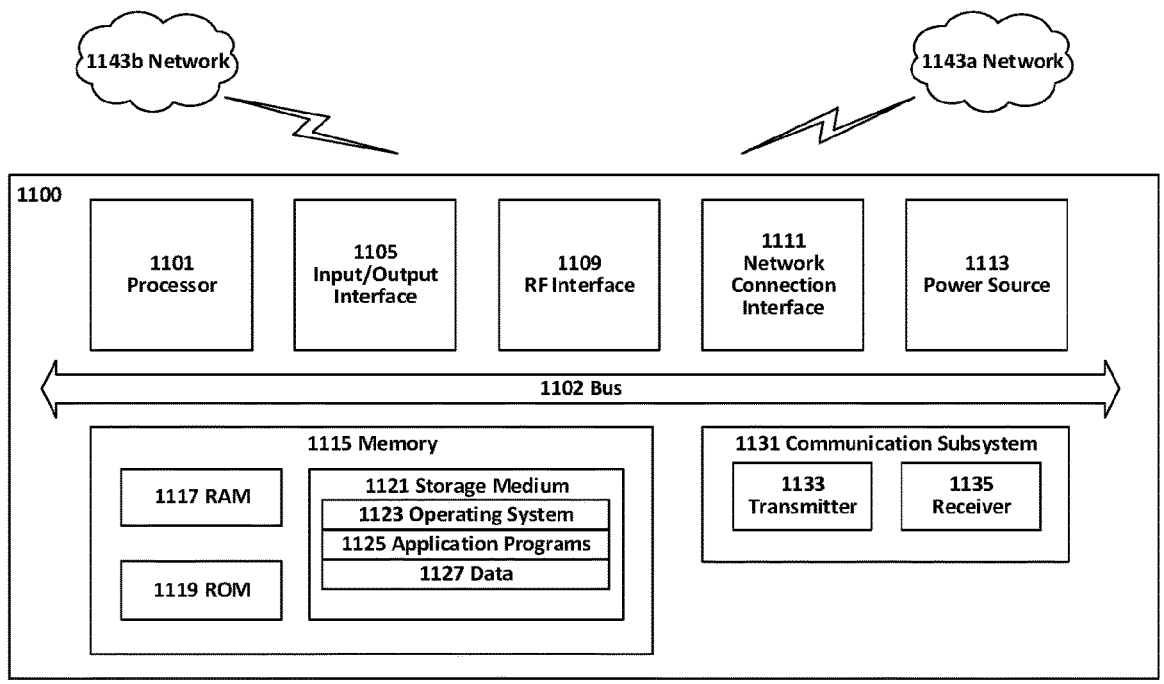
FIG. 11 is a schematic showing a user equipment in accordance with some embodiments.

FIG. 11 is a schematic showing a user equipment in accordance with some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HMS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
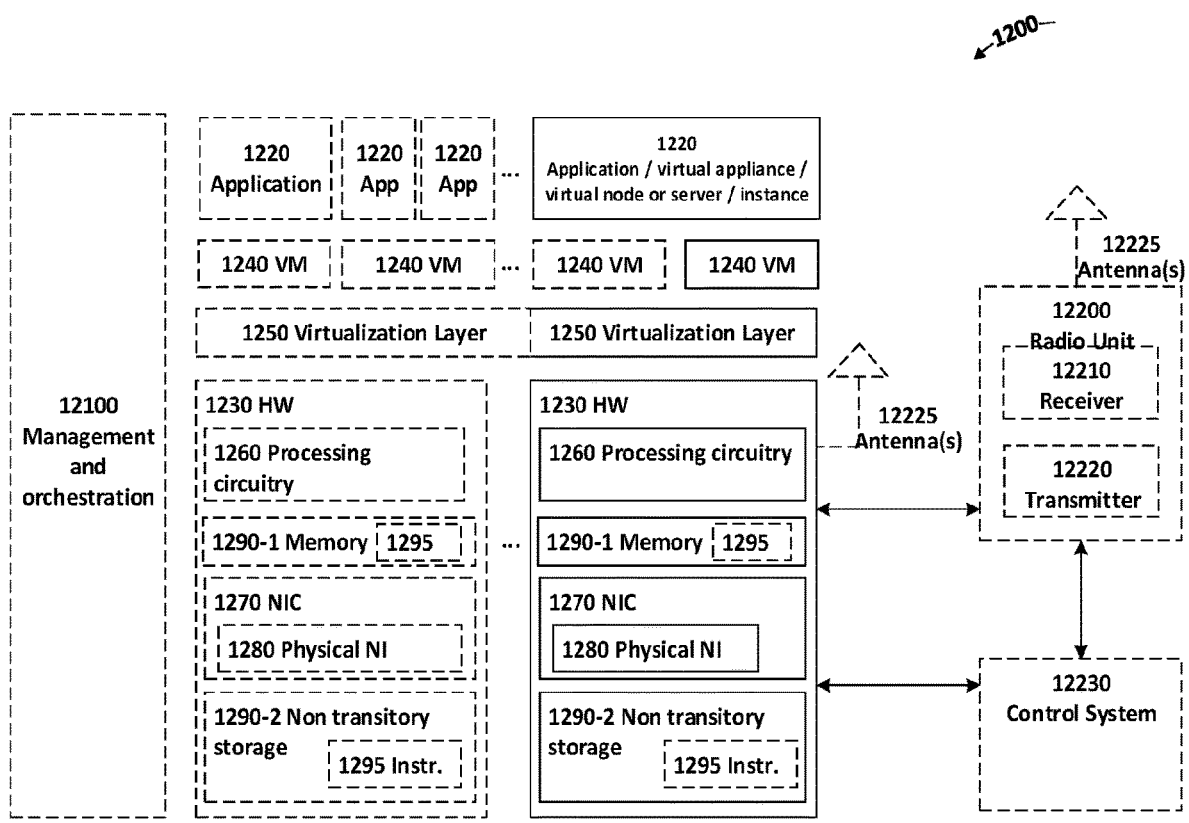
FIG. 12 is a schematic showing a virtualization environment in accordance with some embodiments.

FIG. 12 is a schematic showing a virtualization environment in accordance with some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
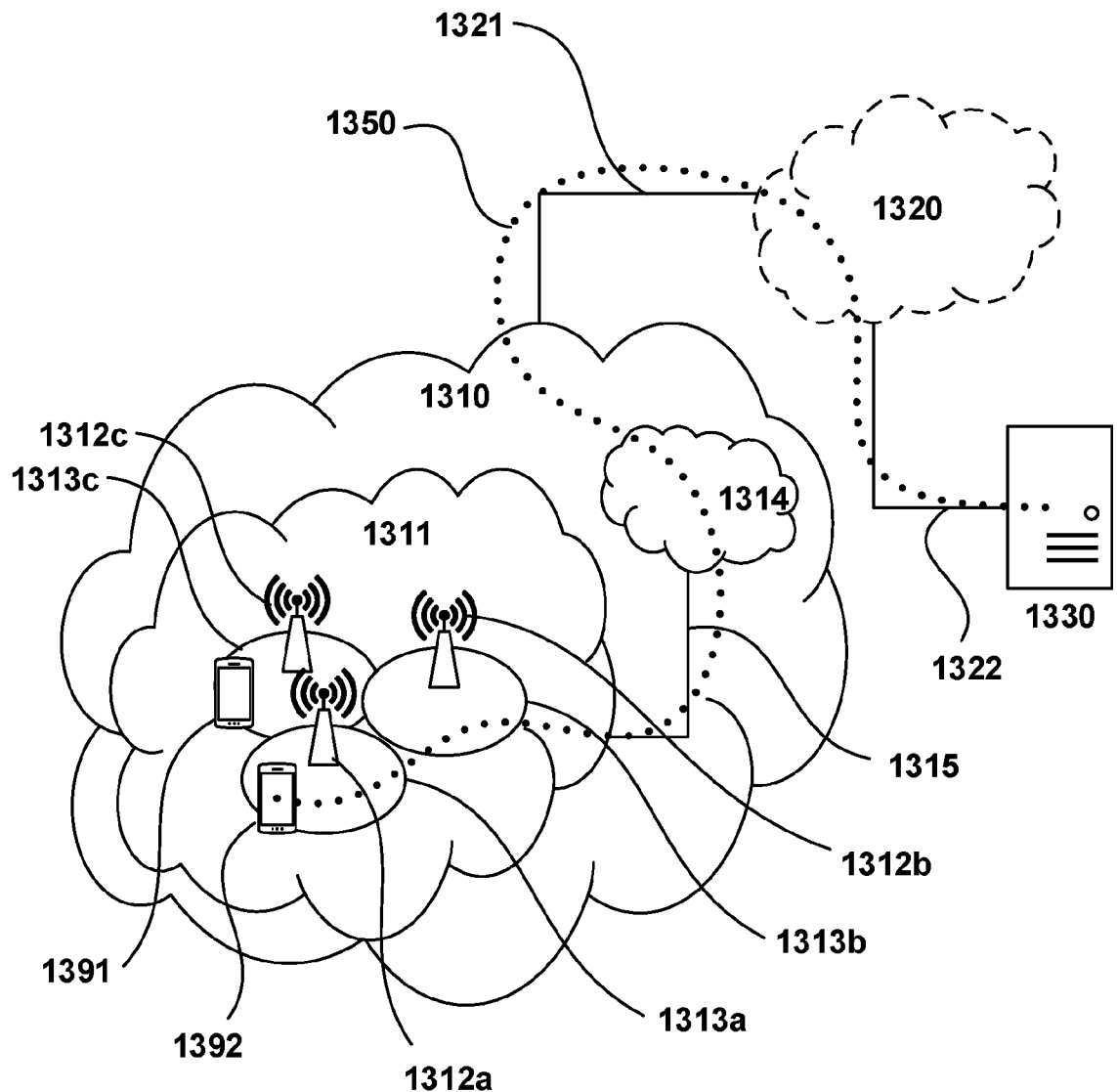
FIG. 13 is a schematic showing a telecommunication network connected via an intermediate network to a host computer in accordance with some embodiments.

FIG. 13 is a schematic showing a telecommunication network connected via an intermediate network to a host computer in accordance with some embodiments.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
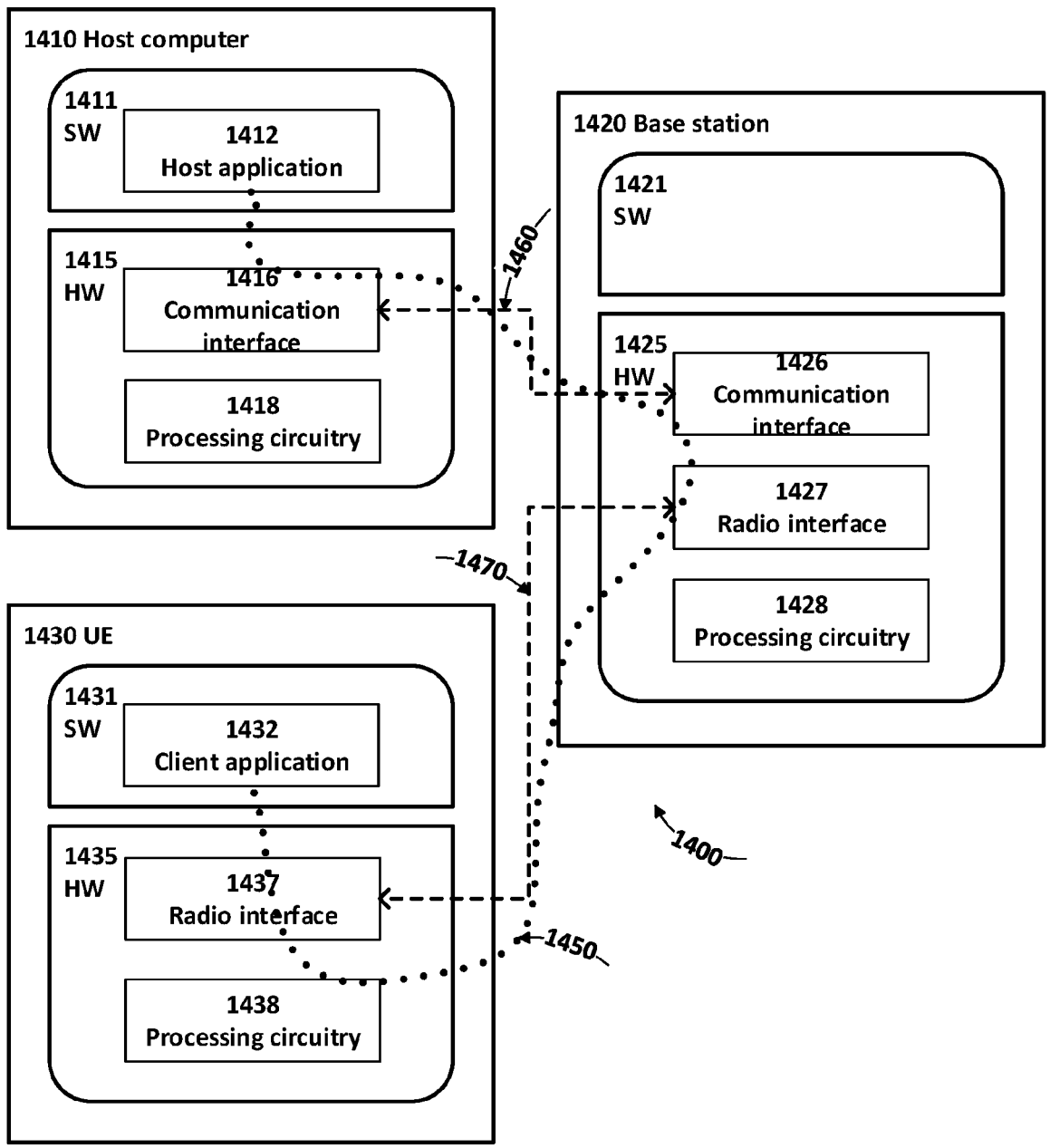
FIG. 14 is a schematic showing a host computer communicating via a base station with a user equipment over a partially wireless connection in accordance with some embodiments.

FIG. 14 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
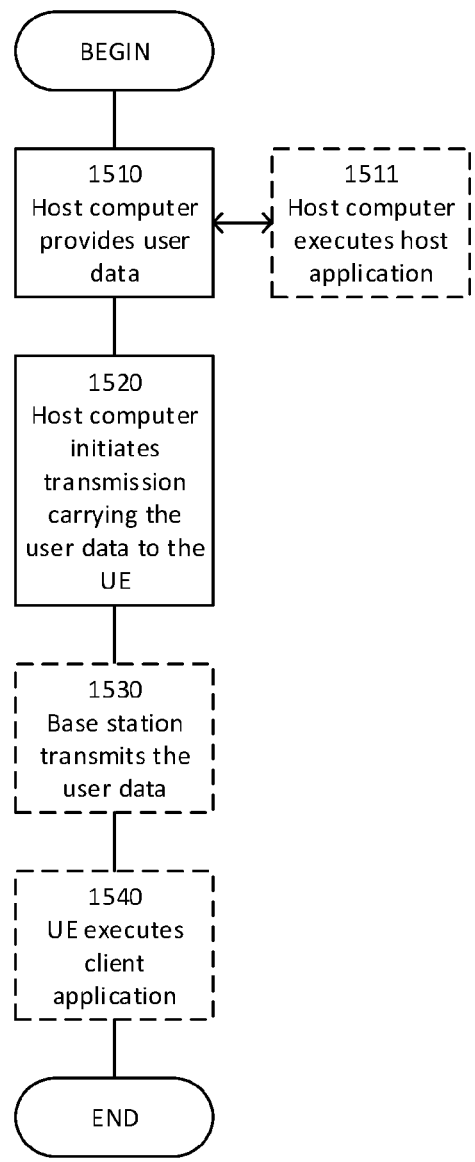
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
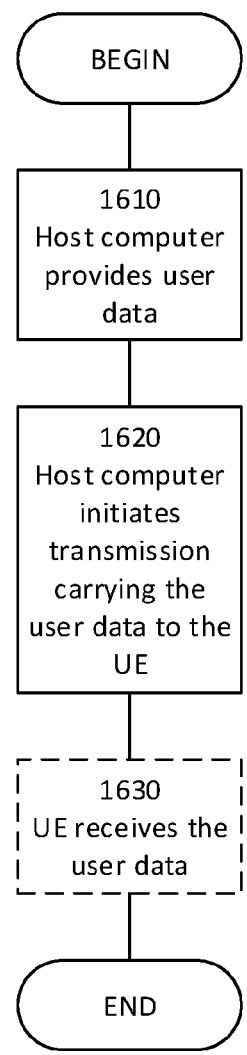
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
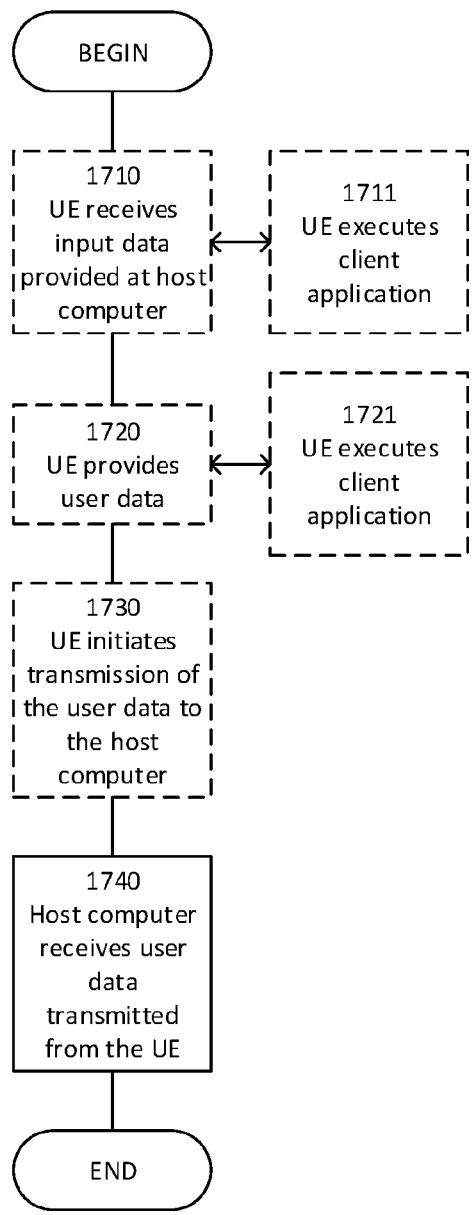
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
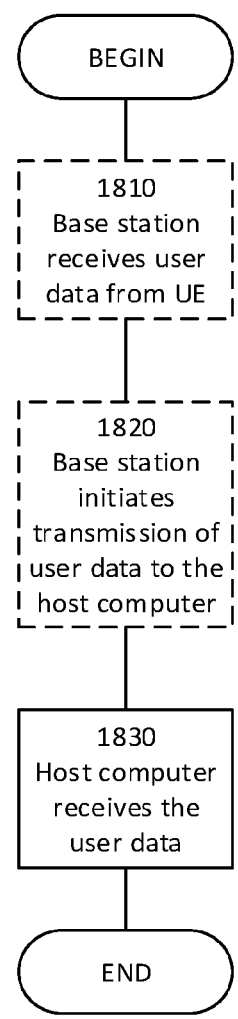
FIG. 18 is a schematic showing methods implemented in a communication system including a host computer, a base station and a user equipment in accordance with some embodiments.

FIG. 18 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. A method performed at a first network function, comprising:
   receiving a request for querying information associated to a location of a terminal device; wherein the request includes an internet protocol, IP, address of the terminal device and an IP address of a server for supporting an application;
   obtaining, from a second network function, a global identifier of the terminal device, based on the IP address of the terminal device, and wherein the request further includes a fully qualified domain name, FQDN, of the application;
   obtaining a location of the terminal device, based on the global identifier or the IP address of the terminal device, wherein the global identifier comprises a generic public subscription identifier, GPSI, of the terminal device;
   determining the server for supporting the application based on at least the location of the terminal device, the FQDN of the application, and the global identifier of the terminal device; and
   transmitting the information associated to the location of the terminal device and the IP address of the server.

2. The method according to claim 1, further comprising:
   requesting a policy control function, PCF, for a user plane function, UPF, reselection.

3. The method according to claim 2,
   wherein the first network function uses a procedure of application function influence traffic routing for requesting UPF reselection.

4. The method according to claim 1, wherein determining the server for supporting the application comprises:
   obtaining, from a third network function, information of at least one server available for supporting the application, based on the location of the terminal device, the global identifier of the terminal device, and the FQDN of the application;
   selecting the determined server for supporting the application from the at least one server; and
   obtaining, from a unified data management, UDM, a determination that a local break out, LBO, procedure and/or a quality of service, QoS, change for the terminal device is allowed.

5. The method according to claim 4,
   wherein the determined server is in an edge network to which the terminal device is connected;
   wherein the terminal device is connected to the determined server via an edge UPF in the edge network, during the LBO procedure; and
   wherein a request from the first network function to PCF for UPF reselection includes at least one of: the IP address of the terminal device, the IP address of the determined server, a port for the application and a protocol for the application.

6. The method according to claim 4,
wherein an edge application configuration is provided by an application function, and stored in the third network function; and
wherein the edge application configuration comprises at least one of: an identifier, a port, a protocol, a required QoS, a FQDN, and a location, for each of at least one server arranged for the application.

7. The method according to claim 4,
wherein the information of the at least one server available for supporting the application comprises at least one of: an IP address, a port, a protocol, a location and a load status, for each of the at least one server available for supporting the application.

8. The method according to claim 1,
wherein the first network function obtains the location of the terminal device, from a UDM, based on the global identifier of the terminal device; and/or
wherein the first network function determines the location of the terminal device, based on a mapping relationship between the location of the terminal device and the IP address of the terminal device.

9. The method according to claim 1,
wherein the first network function comprises a network exposure function, NEF; and/or
wherein the second network function comprises a binding support function, BSF.

10. The method according to claim 1,
wherein the request is originated from the terminal device, or a network function.

11. A method performed at a second network function, comprising:
receiving, from a first network function, an IP address of a terminal device; and
transmitting, to the first network function, a global identifier of the terminal device, based on the IP address of the terminal device;
wherein the global identifier of the terminal device comprises: a generic public subscription identifier, GPSI, of the terminal device;
wherein the GPSI or the IP address of the terminal device is used for obtaining a location of the terminal device; and
wherein at least the location of the terminal device and the global identifier of the terminal device are used for determining a server for supporting an application.

12. The method according to claim 11,
wherein the first network function comprises a network exposure function, NEF; and/or
wherein the second network function comprises a binding support function, BSF.

13. A first network function, comprising:
a processor; and
a memory, the memory containing instructions executable by the processor, whereby the first network function is operative to:
receive a request for querying information associated to a location of a terminal device; wherein the request includes an internet protocol, IP, address of the terminal device and an IP address of a server for supporting an application;
obtain, from a second network function, a global identifier of the terminal device, based on the IP address of the terminal device, and wherein the request further includes a fully qualified domain name, FQDN, of the application;
obtain a location of the terminal device, based on the global identifier or the IP address of the terminal device, wherein the global identifier comprises a generic public subscription identifier, GPSI, of the terminal device;
determine the server for supporting the application based on at least the location of the terminal device, the FQDN of the application, and the global identifier of the terminal device; and
transmit information associated to the location of the terminal device and the IP address of the server.

14. A second network function, comprising:
a processor; and
a memory, the memory containing instructions executable by the processor, whereby the second network function is operative to:
receive, from a first network function, an IP address of a terminal device; and
transmit, to the first network function, a global identifier of the terminal device, based on the IP address of the terminal device;
wherein the global identifier of the terminal device comprises: a generic public subscription identifier, GPSI, of the terminal device;
wherein the GPSI or the IP address of the terminal device is used for obtaining a location of the terminal device; and
wherein at least the location of the terminal device and the global identifier of the terminal device are used for determining a server for supporting an application.

* * * * *